US012804281B2

(12) United States Patent
Akutsu et al.

(10) Patent No.: US 12,804,281 B2
(45) Date of Patent: Nov. 17, 2026

(54) RANGE IMAGING DEVICE AND RANGE IMAGING METHOD

(71) Applicant: TOPPAN HOLDINGS INC., Tokyo (JP)

(72) Inventors: Takahiro Akutsu, Taito-ku (JP); Masanori Nagase, Taito-ku (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 19/201,976

(22) Filed: May 8, 2025

(65) Prior Publication Data

US 2025/0274679 A1 Aug. 28, 2025

Related U.S. Application Data

(63) Continuation of application No. PCT/JP2022/041532, filed on Nov. 8, 2022.

(51) Int. Cl.
*H04N 25/705* (2023.01)
*H04N 25/62* (2023.01)
(Continued)

(52) U.S. Cl.
CPC ........... *H04N 25/705* (2023.01); *H04N 25/62* (2023.01); *H04N 25/706* (2023.01); *H04N 25/745* (2023.01)

(58) Field of Classification Search
CPC .... H04N 25/705; H04N 25/62; H04N 25/706; H04N 25/745; G01S 7/4863; G01S 7/4865; G01S 7/4876; G01S 17/10; G01S 17/894
See application file for complete search history.

(56) References Cited

U.S. PATENT DOCUMENTS

| | | | | |
|---|---|---|---|---|
| 10,768,301 | B2 * | 9/2020 | Geuens | G01S 7/484 |
| 11,953,597 | B2 * | 4/2024 | Egawa | G01S 7/484 |

(Continued)

FOREIGN PATENT DOCUMENTS

| | | | |
|---|---|---|---|
| JP | 6922187 | B2 | 8/2021 |

OTHER PUBLICATIONS

International Search Report issued Dec. 20, 2022 in PCT/JP2022/041532, filed Nov. 8, 2022, with English translation, 5 pages.

*Primary Examiner* — Hung H Lam
(74) *Attorney, Agent, or Firm* — Oblon, McClelland, Maier & Neustadt, L.L.P.

(57) ABSTRACT

A range imaging device includes a light source that emits light pulse to measurement space; a light-receiving unit including a pixel having a photoelectric conversion device that generates charge corresponding to incident light and charge storage units that integrates the charge, and a pixel driver circuit that distributes the charge to the storage units; and a range image processing unit that calculates distance to subject in the space. The processing unit calculates lower threshold based on degree of variation in integrated signal identified to contain, among integrated signals corresponding to the amounts of charge integrated in the storage units in current frame, signal corresponding to amount of charge originating from the light pulse reflected off the subject, and signal corresponding to amount of charge originating from ambient light, and uses the integrated signal and lower threshold to control exposure time in another frame that is temporally after the current frame.

15 Claims, 10 Drawing Sheets

(51) Int. Cl.
*H04N 25/706* (2023.01)
*H04N 25/71* (2023.01)

(56) References Cited

U.S. PATENT DOCUMENTS

| | | | | |
|---|---|---|---|---|
| 11,979,673 | B2 * | 5/2024 | Finateu | H04N 25/00 |
| 12,140,677 | B2 * | 11/2024 | Kawahito | G01S 13/785 |
| 12,363,441 | B2 * | 7/2025 | Kaneko | H04N 23/60 |
| 12,526,543 | B2 * | 1/2026 | Hosaki | H04N 23/73 |
| 2021/0103054 | A1 * | 4/2021 | Imai | G01S 7/484 |

* cited by examiner

RANGE IMAGING DEVICE AND RANGE IMAGING METHOD

CROSS-REFERENCE TO RELATED APPLICATIONS

The present application is a continuation of and claims the benefit of priority to International Application No. PCT/JP2022/041532, filed Nov. 8, 2022, the entire contents of which are incorporated herein by reference.

BACKGROUND OF THE INVENTION

Field of the Invention

The present invention relates to a range imaging device and a range imaging method.

Description of Background Art

JP 6922187 B describes a time-of-flight (hereinafter referred to as "TOF") range imaging device. The entire contents of this publication are incorporated herein by reference.

SUMMARY OF THE INVENTION

According to one aspect of the present invention, a range imaging device includes a light source that emits a light pulse to a measurement space, a light-receiving unit including a pixel having a photoelectric conversion device and charge storage units that integrates charge generated by the photoelectric conversion device, and a range image processing unit including circuitry that calculates a distance to a subject in the measurement space based on amounts of charge integrated in the charge storage units. The photoelectric conversion device of the pixel in the light-receiving unit generates the charge corresponding to incident light, the light-receiving unit includes a pixel driver circuit that distributes the charge to the charge storage units for integration at a storage timing synchronized with an emission timing at which the light pulse is emitted, and the circuitry of the range image processing unit calculates a lower threshold based on a degree of variation in an integrated signal identified to include, among integrated signals corresponding to the amounts of charge integrated in the charge storage units in a current frame, a signal corresponding to an amount of charge originating from the light pulse reflected off the subject, and a signal corresponding to an amount of charge originating from ambient light, and uses the integrated signal and the lower threshold to control an exposure time in another frame that is temporally after the current frame.

According to another aspect of the present invention, a range imaging method includes emitting a light pulse to a measurement space from a light source unit of a range imaging device, and calculating a distance to a subject in the measurement space based on amounts of charge integrated in charge storage units of a light-receiving unit in the range imaging device. The range imaging device includes the light source that emits the light pulse to the measurement space, the light-receiving unit including a pixel having a photoelectric conversion device and the charge storage units that integrate charge generated by the photoelectric conversion device, and a range image processing unit including circuitry that calculates the distance to the subject in the measurement space based on the amounts of charge integrated in the charge storage units, the photoelectric conversion device of the pixel in the light-receiving unit generates the charge corresponding to incident light, the light-receiving unit includes a pixel driver circuit that distributes the charge to the charge storage units for integration at a storage timing synchronized with an emission timing at which the light pulse is emitted, and the circuitry of the range image processing unit calculates a lower threshold based on a degree of variation in an integrated signal identified to include, among integrated signals corresponding to the amounts of charge integrated in the charge storage units in a current frame, a signal corresponding to an amount of charge originating from the light pulse reflected off the subject, and a signal corresponding to an amount of charge originating from ambient light, and uses the integrated signal and the lower threshold to control an exposure time in another frame that is temporally after the current frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
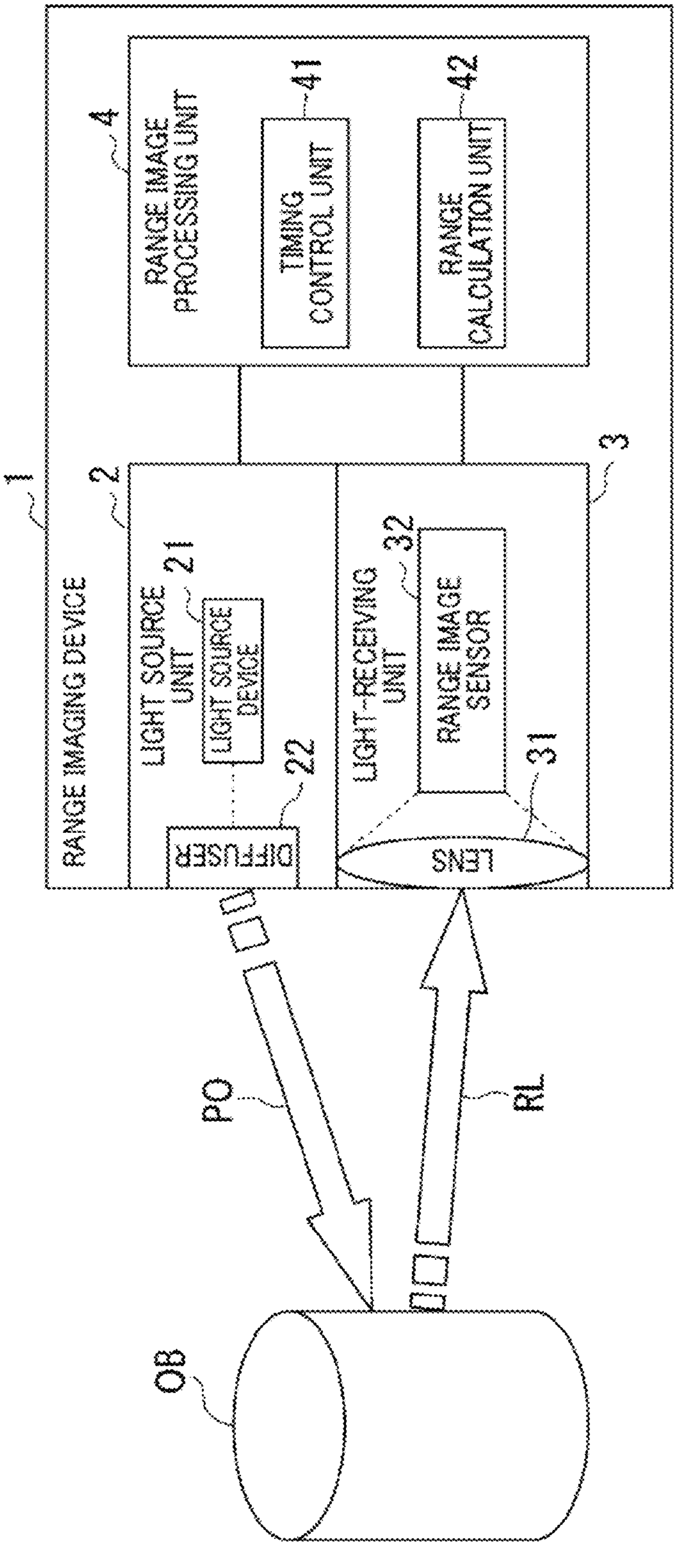
FIG. 1 is a block diagram illustrating an example of a range imaging device according to an embodiment.

Embodiments will now be described with reference to the accompanying drawings, wherein like reference numerals designate corresponding or identical elements throughout the various drawings.

FIG. 1 is a block diagram illustrating an example of a range imaging device according to an embodiment of the present invention. The range imaging device 1 includes, for example, a light source unit 2, a light-receiving unit 3, and a range image processing unit 4. FIG. 1 also illustrates a subject OB the distance to which will be measured by the range imaging device 1.

In response to a control procedure performed by the range image processing unit 4, the light source unit 2 emits a light pulse PO into an imaging space in which the subject OB exists in the range imaging device 1. The light source unit 2 may be, for example, a surface-emitting semiconductor laser module such as a vertical-cavity surface-emitting laser (VCSEL). The light source unit 2 includes, for example, a light source device 21 and a diffuser 22.

The light source device 21 is a light source that emits a laser beam in a near-infrared wavelength band (for example, a wavelength band in which the wavelength is 850 nm to 940 nm), which serves as the light pulse PO projected to the subject OB. The light source device 21 is, for example, a semiconductor laser light-emitting device. The light source device 21 emits a pulsed laser beam in response to the control procedure performed by a timing control unit 41.

The diffuser 22 is an optical component that diffuses a laser beam in the near-infrared wavelength band emitted from the light source device 21. The pulsed laser beam diffused by the diffuser 22 is output as the light pulse PO and projected to the subject OB.

The light-receiving unit 3 receives reflected light RL that is the light pulse PO reflected off the subject OB and outputs a pixel signal corresponding to the received reflected light RL. The light-receiving unit 3 includes, for example, a lens 31 and a range image sensor 32.

The lens 31 is an optical lens that introduces the reflected light RL that is incident on the lens 31 to the range image sensor 32. The lens 31 outputs the incident reflected light RL toward the range image sensor 32, so that the light can be received by (be incident on) the pixels provided in the light-receiving region of the range image sensor 32.

The range image sensor 32 is an imaging element used in the range imaging device 1. The range image sensor 32 includes pixels in a two-dimensional light-receiving region. Each pixel of the range image sensor 32 includes a single photoelectric conversion device, charge storage units corresponding to the single photoelectric conversion device, and a component that distributes electric charge to the charge storage units. In other words, each pixel is an imaging element with a distribution structure distributing charge to the charge storage units for integration therein.

The range image sensor 32 distributes the electric charge generated by the photoelectric conversion device to each charge storage unit in response to the control procedure performed by the timing control unit 41. Additionally, the range image sensor 32 outputs a pixel signal corresponding to the amount of charge that has been distributed to each charge storage unit. The range image sensor 32 includes pixels formed in a two-dimensional matrix and outputs pixel signals corresponding to the respective pixels for each frame.

The range image processing unit 4 controls the range imaging device 1 to calculate the distance to the subject OB. The range image processing unit 4 includes the timing control unit 41 and a range calculation unit 42.

The timing control unit 41 controls the timings at which various control signals used for measurement are output. The various control signals include, for example, a signal for controlling emission of the light pulse PO, a signal for distributing the reflected light RL to the charge storage units, and a signal for controlling the number of distributions per frame. The number of distributions refers to the number of times the process of distributing charge to the charge storage units for integration therein (integration process) is repeated.

The range calculation unit 42 outputs distance information obtained by calculating the distance to the subject OB, based on the pixel signal output from the range image sensor 32. The range calculation unit 42 calculates a delay time Td from the time at which the light pulse PO is emitted to the time at which the reflected light RL is received, based on the amounts of charge integrated in the charge storage units. The range calculation unit 42 calculates the distance to the subject OB in accordance with the calculated delay time Td.

With this configuration, the range imaging device 1 causes the light source unit 2 to emit the light pulse PO, causes the light-receiving unit 3 to receive the reflected light RL reflected off the subject OB, and causes the range image processing unit 4 to measure the distance to the subject OB and output it as the distance information.

FIG. 1 shows the range imaging device 1 in which the range image processing unit 4 is included; however, the range image processing unit 4 may be a component provided outside the range imaging device 1.

Figure 2:
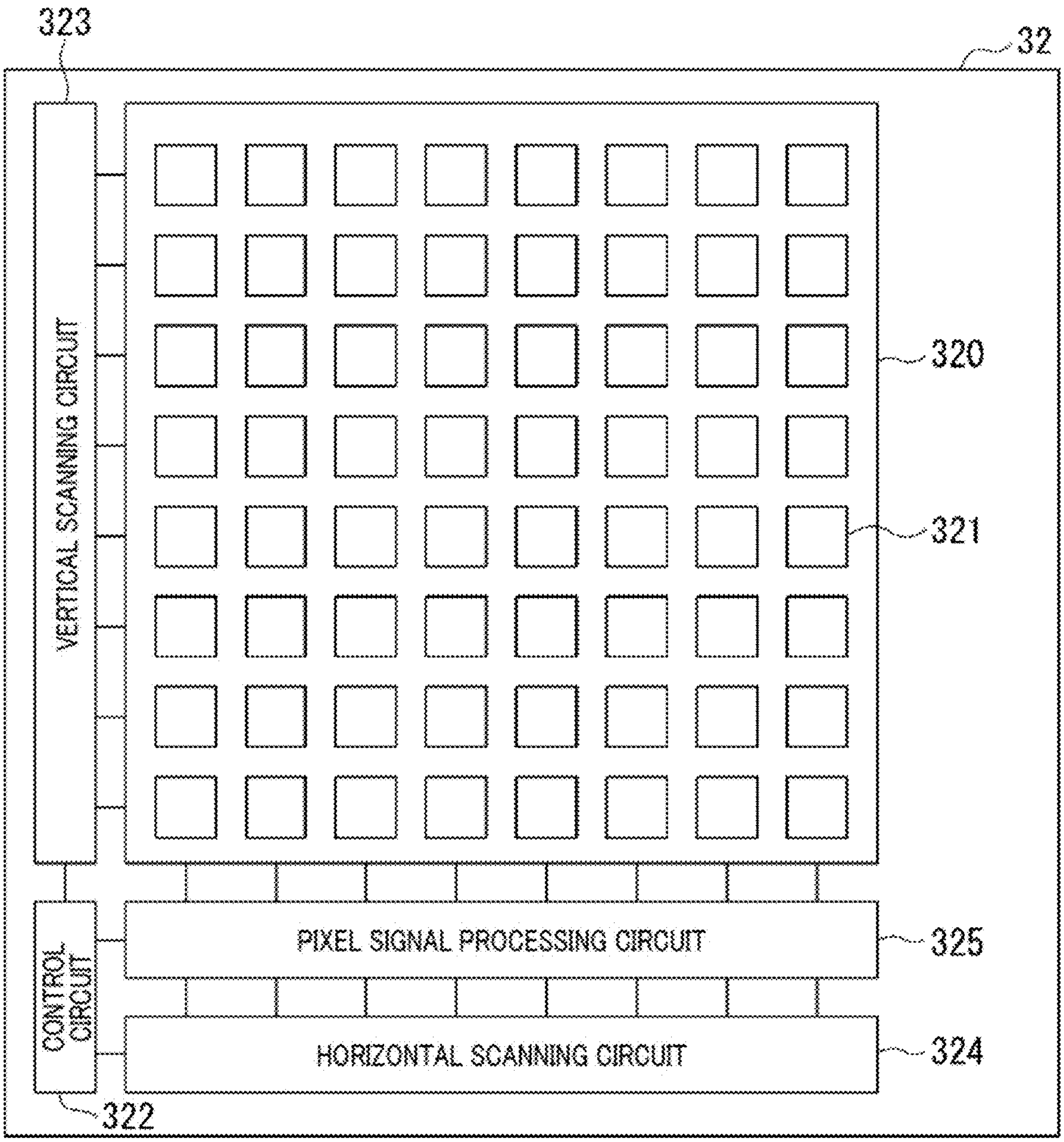
FIG. 2 is a block diagram illustrating an example of an imaging element according to the embodiment.

Next, referring to FIG. 2, a configuration of the range image sensor 32 will be described. FIG. 2 is a block diagram illustrating an example of an imaging element (range image sensor 32) according to the embodiment.

As illustrated in FIG. 2, the range image sensor 32 includes, for example, a light-receiving region 320 in which pixels 321 are formed, a control circuit 322, a vertical scanning circuit 323 performing distribution operation, a horizontal scanning circuit 324, and a pixel signal processing circuit 325.

The light-receiving region 320 is a region in which the pixels 321 are formed. FIG. 2 shows a case where the pixels 321 are formed in a two-dimensional 8×8 matrix. The pixels 321 integrate charge corresponding to the amount of light received. The control circuit 322 performs overall control of the range image sensor 32. For example, the control circuit 322 controls the operation of the components of the range image sensor 32 according to instructions from the timing control unit 41 of the range image processing unit 4. The components of the range image sensor 32 may be directly controlled by the timing control unit 41. In this case, the control circuit 322 may be omitted.

The vertical scanning circuit 323 is a circuit that controls the pixels 321 formed in the light-receiving region 320 row by row in response to the control procedure performed by the control circuit 322. The vertical scanning circuit 323 causes the pixel signal processing circuit 325 to output a voltage signal corresponding to the amount of charge integrated in each of the charge storage units of each pixel 321. In this case, the vertical scanning circuit 323 distributes the charge converted by the photoelectric conversion device to each of the charge storage units of each pixel 321. That is, the vertical scanning circuit 323 is an example of a "pixel driver circuit".

The pixel signal processing circuit 325 is a circuit that performs predetermined signal processing (for example, noise suppression and A/D conversion) on voltage signals output from the pixels 321 of each column to a corresponding vertical signal line in response to the control procedure performed by the control circuit 322.

The horizontal scanning circuit 324 is a circuit that sequentially outputs the signals output from the pixel signal processing circuit 325 to horizontal signal lines, in response to the control procedure performed by the control circuit 322. Accordingly, the pixel signals corresponding to the amounts of charge integrated per frame are sequentially output to the range image processing unit 4 via the horizontal signal lines.

The following description assumes that the pixel signal processing circuit 325 performs A/D conversion processing, and the pixel signal is a digital signal.

Figure 3:
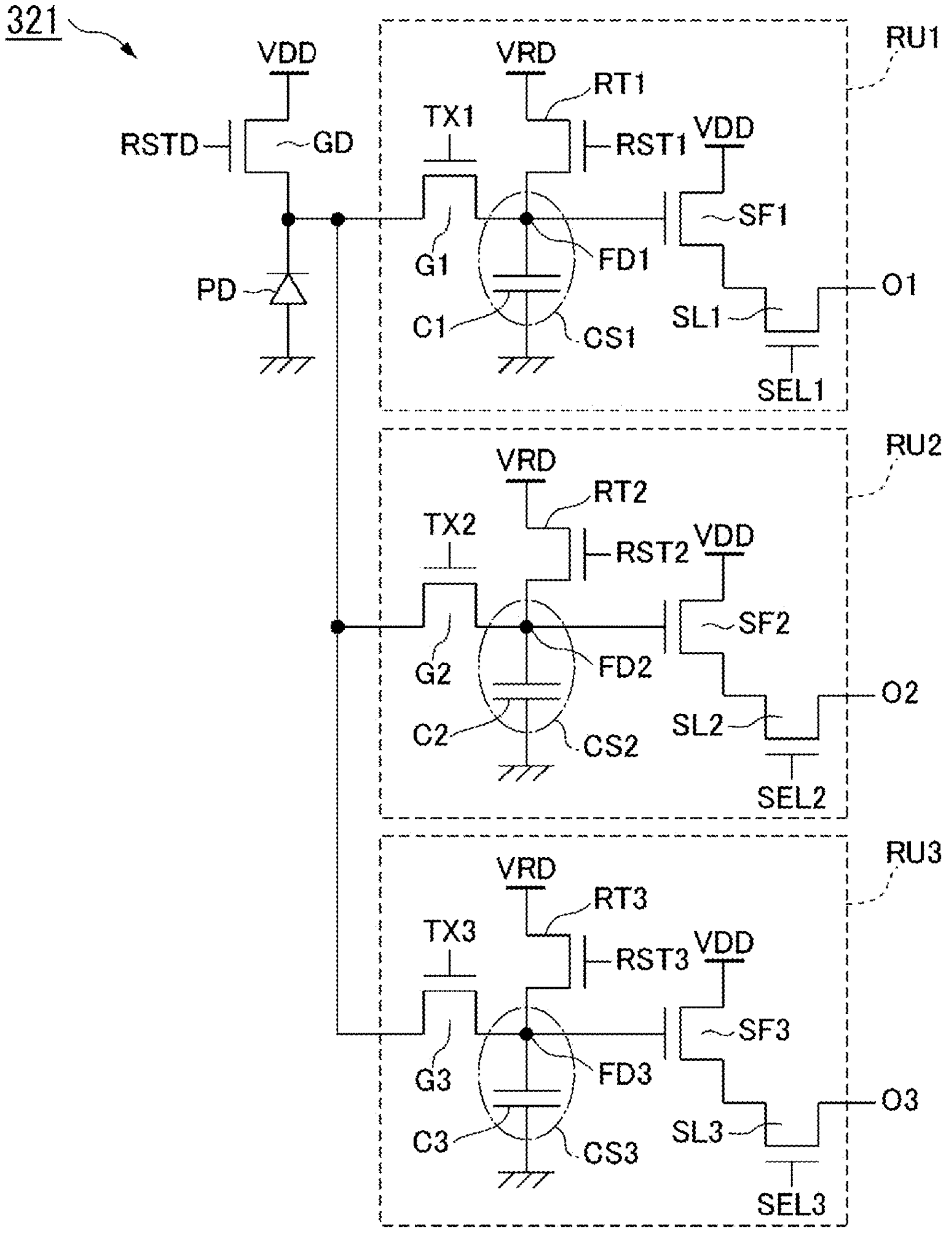
FIG. 3 is a circuit diagram illustrating an example of a pixel according to the embodiment.

Next, referring to FIG. 3, a configuration of the pixels 321 will be described. FIG. 3 is a circuit diagram illustrating a configuration example of the pixels 321 formed in the light-receiving region 320 of the imaging element (range image sensor 32) according to the embodiment of the present invention. FIG. 3 illustrates a configuration example of one of the pixels 321 formed in the light-receiving region 320. The pixel 321 has an example configuration including three readout units RU.

The pixel 321 includes one photoelectric conversion device PD, a drain transistor GD, and three readout units RU (readout units RU1 to RU3). Each readout unit RU outputs a voltage signal from a corresponding output terminal O. The readout units RU each include a readout transistor G, a floating diffusion FD, a charge storage capacitor C, a reset transistor RT, a source follower transistor SF, and a selection transistor SL. In each readout unit RU, the floating diffusion FD and the charge storage capacitor C constitute a charge storage unit CS.

In FIG. 3, a numerical value "1", "2", or "3" is appended after the reference sign "RU" of the three readout units RU to distinguish the readout units RU from one another. Similarly, the numerical values are also appended after the reference signs of the components of the three readout units RU to distinguish the components by specifying the readout units RU with which they are associated.

In the pixel 321 shown in FIG. 3, the readout unit RU1 that outputs a voltage signal from an output terminal O1 includes, for example, a readout transistor G1, a floating diffusion FD1, a charge storage capacitor C1, a reset transistor RT1, a source follower transistor SF1, and a selection transistor SL1. In the readout unit RU1, the floating diffusion FD1 and the charge storage capacitor C1 constitute a charge storage unit CS1. The readout units RU2 and RU3 have similar configurations.

The photoelectric conversion device PD is an embedded photodiode which performs photoelectric conversion for incident light, generates charge corresponding to the incident light, and integrates the generated charge. The photoelectric conversion device PD may have any configuration. The photoelectric conversion device PD may be, for example, a PN photodiode including a P-type semiconductor and an N-type semiconductor joined together, or may be a PIN photodiode including an I-type semiconductor sandwiched between P- and N-type semiconductors. Alternatively, without being limited to a photodiode, the photoelectric conversion device PD may be, for example, a photogate-type photoelectric conversion device.

In the pixels 321, the charge generated through photoelectric conversion of the incident light by the photoelectric conversion device PD is distributed to each of three charge storage units CS (charge storage units CS1 to CS3), and respective voltage signals corresponding to the amounts of charge distributed are output to the pixel signal processing circuit 325.

The configuration of the pixels formed in the range image sensor 32 is not limited to the configuration including three readout units RU as illustrated in FIG. 3 and may be any configuration including readout units RU. That is, the number of the readout units RU (charge storage units CS) included in each pixel of the range image sensor 32 may be two, four, or more.

Further, the pixel 321 configured as illustrated in FIG. 3 shows a configuration example in which each charge storage unit CS includes the floating diffusion FD and the charge storage capacitor C. However, each charge storage unit CS may have any configuration as long as at least the floating diffusion FD is included, and the pixel 321 does not necessarily have to include the charge storage capacitor C.

The pixel 321 illustrated in FIG. 3 shows a configuration example including the drain transistor GD; however, if the charge stored (remaining) in the photoelectric conversion device PD is not required to be discarded, the drain transistor GD does not necessarily have to be included.

The range imaging device 1 of this embodiment controls exposure according to signal values of integrated signals Q, which correspond to the amounts of charge integrated in the charge storage units CS per frame. The charge storage units CS integrate a combination of the amounts of charge corresponding to the reflected light RL and ambient light. Therefore, an integrated signal contains components corresponding to the reflected light RL and the ambient light. In this embodiment, exposure is not controlled solely according to ambient light, but according to the signal values of the integrated signals Q, which contain components corresponding to the reflected light RL and ambient light. The exposure control performed by the range imaging device 1 will be described.

First, the properties of light and electrons (photoelectrons) generated by photoelectric conversion of the light will be described with reference to FIGS. 4 to 6. The light here refers to light incident on the range imaging device 1 containing at least the reflected light RL and ambient light. Ambient light refers to light that can be incident on the range imaging device 1 other than the reflected light RL. For example, it may be sunlight when measurement is performed outdoors, or indoor light when measurement is performed indoors.

Light generally contains a noise component called optical shot noise or similar. Due to this, there is variation (a noise component) in the amount of light incident on the light-receiving unit 3 per unit time. Light has a property that the mean of the amount of light (number of photons) is proportional to its variance.

Photoelectrons are electrons generated when light is converted by photoelectric conversion, and they inherit these properties of light. In other words, photoelectrons have properties that they contain a noise component originating from optical shot noise, and the mean of the number of photoelectrons is proportional to its variance (see FIG. 4).

Figure 4:
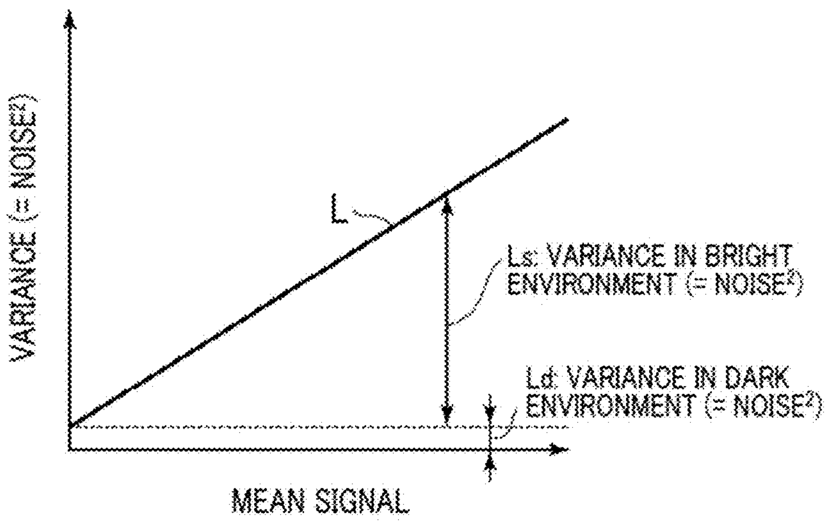
FIG. 4 is a diagram illustrating processing performed by the range imaging device according to the embodiment.

FIG. 4 is a diagram illustrating processing performed by the range imaging device 1 of the present embodiment. In FIG. 4, the horizontal axis indicates the mean signal, and the vertical axis indicates the variance (square of noise). The mean signal is the mean of integrated signals Q corresponding to the amounts of charge integrated in the charge storage units CS. The variance is the mean of the squared differences (noise) between the integrated signals Q and the mean signal. The mean signal is an integrated signal originating from photoelectrons generated by photoelectric conversion of the received light, and has a value calculated based on formula (1).

$$\text{Mean signal} = \text{mean signal in bright environment} - \text{mean signal in dark environment} \quad (1)$$

The term "mean signal in bright environment" in formula (1) refers to the mean of the integrated signal measured in a bright environment, that is, in an environment in which the range imaging device 1 can receive light. It is the mean of the sum of signals mixed in the integrated signal, namely, the integrated signal originating from photoelectrons generated by the photoelectric conversion of the received light, and the "mean signal in dark environment". The term "mean signal in dark environment" in formula (1) refers to the mean of the integrated signal measured in a dark environment, that is, in an environment in which the range imaging device 1 cannot receive light.

Therefore, the "mean signal" can be calculated by subtracting the "mean signal in dark environment" from the "mean signal in bright environment".

As shown by the line segment L in FIG. 4, since the photoelectrons inherit the properties of light, the relationship between the "mean signal" and the "variance" can be expressed by a simple linear function. The variance is a combined value of a component Ld caused by noise in a dark environment and a component Ls caused by optical shot noise. The component Ld caused by the noise in a dark environment has a constant value regardless of the magnitude of the mean signal. On the other hand, the component Ls caused by the optical shot noise has a value proportional to the magnitude of the mean signal. This means that the relationship between the variance and the mean signal can be expressed by a linear function having an intercept depending on the component Ld and a slope depending on the component Ls. The relationship between variance and mean signal is not limited to the pixel 321, and substantially the same tendency can be seen in pixels of chips produced with the same design. On the other hand, when the type of chip is different, the relationship between the variance and the mean signal remains a linear function, but the values of the intercept and slope change.

Figure 5:
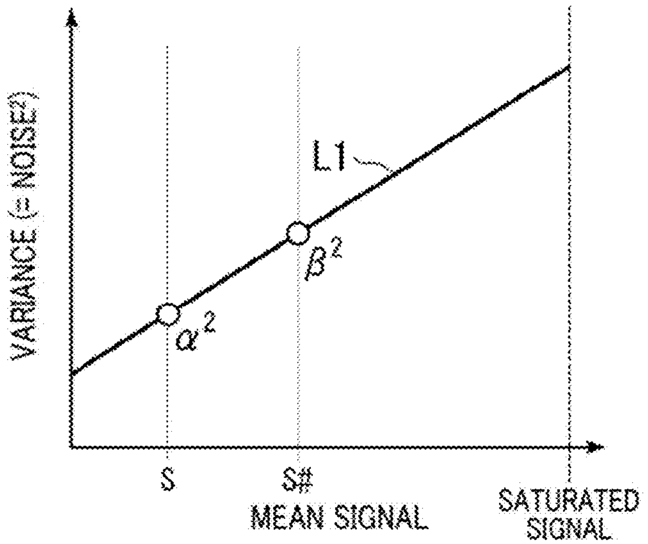
FIG. 5 is a diagram illustrating processing performed by the range imaging device according to the embodiment.

FIG. 5 is a diagram illustrating processing performed by the range imaging device 1 of the present embodiment. Similarly to FIG. 4, the relationship between the "mean signal" and the "variance" is represented by the line segment L1 in FIG. 5. FIG. 5 shows that the variance is $\alpha^2$ when the mean signal has a signal value of S, and that the variance is $\beta^2$ when the mean signal has a signal value of S #. The signal values S and S # are both smaller than a saturated signal. The saturated signal is a signal corresponding to the upper limit of the amount of charge that can be integrated in a charge storage unit CS.

Figure 6:
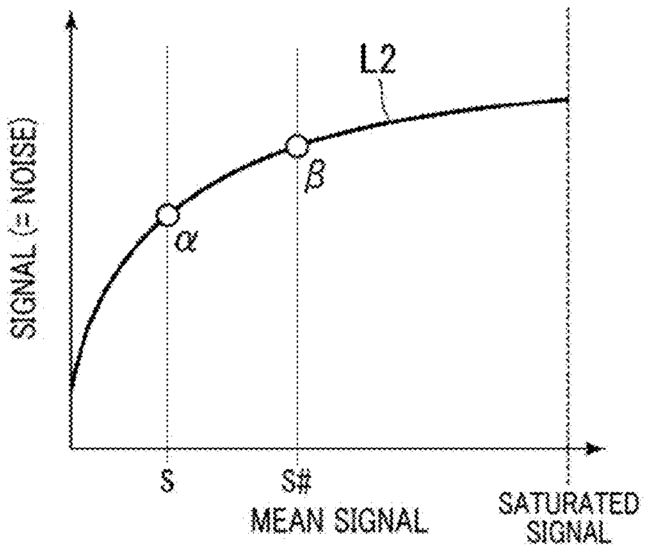
FIG. 6 is a diagram illustrating processing performed by the range imaging device according to the embodiment.

FIG. 6 is a diagram illustrating processing performed by the range imaging device 1 of the present embodiment. In FIG. 6, the vertical axis of the graph in FIG. 5 now represents noise (square root of variance), and the relationship between the "mean signal" and the "signal (noise)" is represented by a line segment L2. FIG. 6 shows that the noise is a when the mean signal has a signal value of S, and that the noise is β when the mean signal has a signal value of S #.

In this embodiment, the intercept and slope of the line segment L, which represents the relationship between the mean signal and the variance, is acquired in advance by integrating charges in the charge storage units CS and causing them to output integrated signals. Information (noise information) on the line segment L thus determined is stored in advance in the range imaging device 1. As the information on the line segment L1, the intercept and slope of the line segment L1 may be stored as parameters, or a table showing the relationship between the "mean signal" and "variance" may be stored as the noise information. It is also possible to store a table showing the relationship between the "mean signal" and the "noise" as the noise information.

Figure 7:
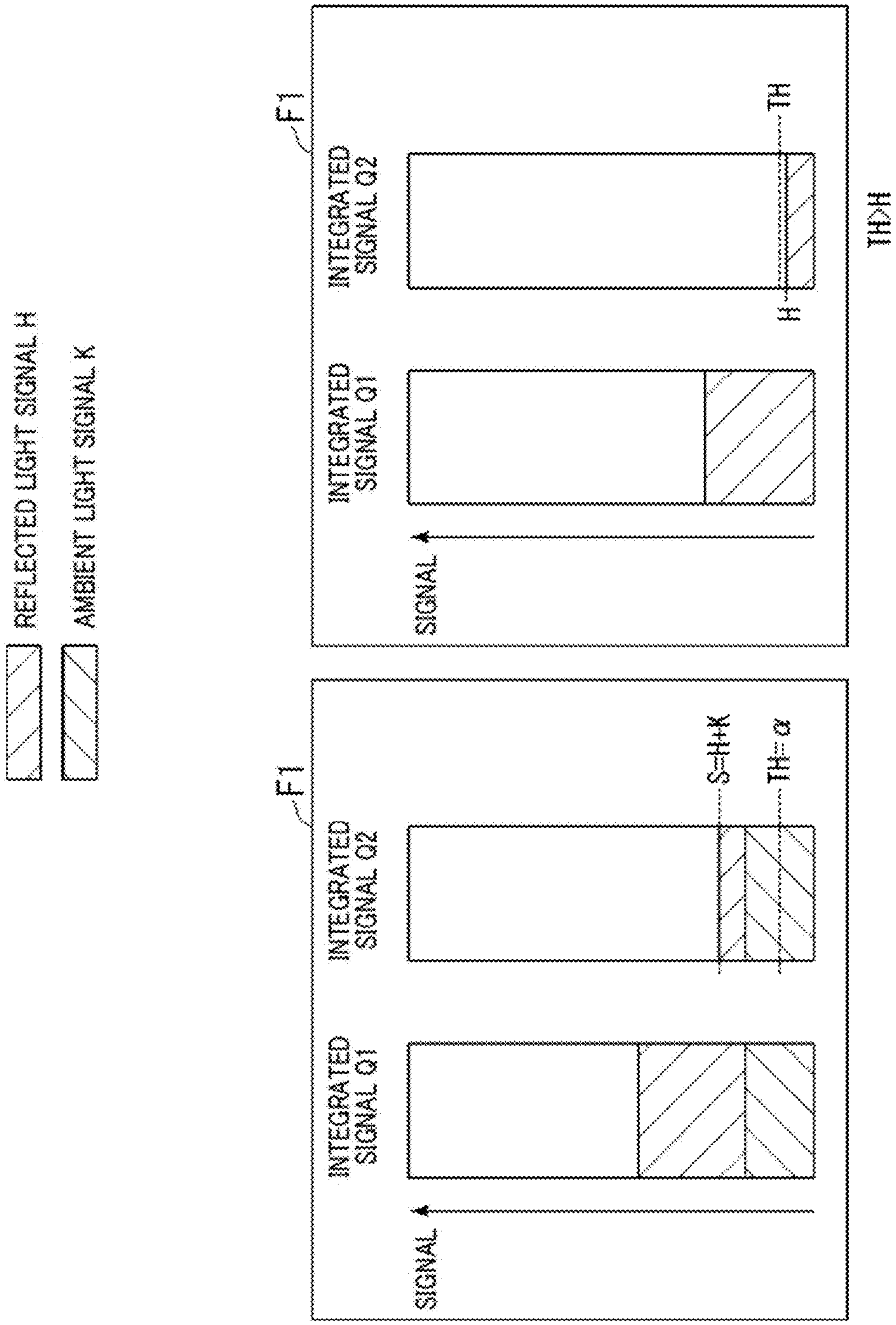
FIG. 7 is a diagram illustrating processing performed by the range imaging device according to the embodiment.
Figure 8:
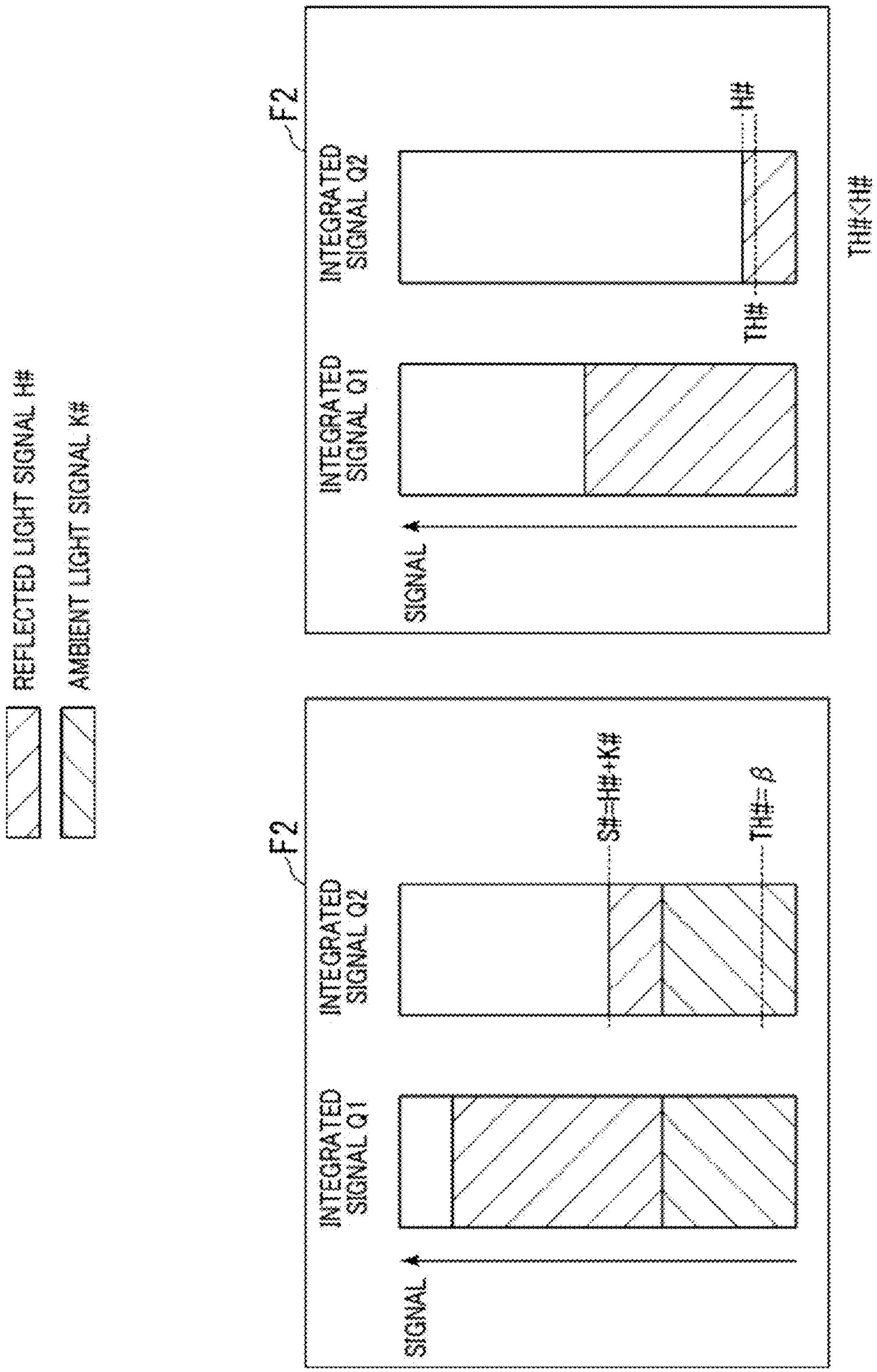
FIG. 8 is a diagram illustrating processing performed by the range imaging device according to the embodiment.

Next, referring to FIGS. 7 and 8, a method in which the range imaging device 1 determines whether underexposure occurred will be described. FIGS. 7 and 8 are diagrams illustrating processing performed by the range imaging device 1 of the present embodiment.

FIG. 7 shows a schematic breakdown of two integrated signals Q (integrated signals Q1 and Q2). The two integrated signals Q here have signal values corresponding to the amounts of charge integrated in two charge storage units CS provided in a pixel 321 driven in a certain frame F1.

As shown in FIG. 7, each of the integrated signals Q1 and Q2 contains a reflected light signal H, which is a signal component originating from the reflected light RL, and an ambient light signal K, which is a signal component originating from ambient light.

For example, the range image processing unit 4 drives the pixel 321 in each frame to acquire the integrated signals Q corresponding to the amounts of charge integrated in the charge storage units CS, and based on the acquired integrated signals Q, determines the integrated signal Q used to determine whether underexposure occurred.

Of the integrated signals Q output from the pixel 321, the range image processing unit 4 selects the one with the smaller signal value between two integrated signals Q containing the reflected light signal H for the evaluation of whether underexposure occurred. For example, in the example of FIG. 7, each of the integrated signals Q1 and Q2 contains the reflected light signal H, and the integrated signal Q2 has a smaller signal value than the integrated signal Q1. In this case, the range image processing unit 4 determines whether underexposure occurred based on the value of the integrated signal Q2, which has the smaller signal value.

As shown in the left diagram of FIG. 7, the range image processing unit 4 determines a lower threshold TH based on the signal value S of the integrated signal Q2. For example, the range image processing unit 4 refers to the pre-stored noise information, that is, the relationship between the mean signal and the variance, to identify that the noise corresponding to the signal value S of the integrated signal Q2 is α, and determines the lower threshold TH based on the identified noise (α). For example, the range image processing unit 4 sets the noise (α) as the lower threshold TH. Alternatively, the range image processing unit 4 may set the value obtained by multiplying the noise (α) by N as the lower threshold TH. N is a real number greater than zero.

As shown in the right diagram of FIG. 7, the range image processing unit 4 compares the reflected light signal H in the integrated signal Q2 with the lower threshold TH. The range image processing unit 4 subtracts the ambient light signal K from the integrated signal Q2 by applying a conventional technique. For example, when the range image processing unit 4 is provided with a dedicated charge storage unit CS that integrates only charges originating from ambient light, the integrated signal Q corresponding to that dedicated charge storage unit CS is treated as the ambient light signal K. The reflected light signal H contained in the integrated signal Q2 is calculated by subtracting the ambient light signal K from the integrated signal Q2. The range image processing unit 4 compares the calculated reflected light signal H with the lower threshold value TH.

If the comparison between the reflected light signal H and the lower threshold TH indicates that the reflected light signal H is lower than the lower threshold TH, the range image processing unit 4 determines that underexposure occurred. On the other hand, if the comparison between the reflected light signal H and the lower threshold TH indicates that the reflected light signal H is greater than or equal to the lower threshold TH, the range image processing unit 4 determines that underexposure did not occur. In the example shown in FIG. 7, the reflected light signal H is lower than the lower threshold TH (TH>H), and therefore it is determined that underexposure occurred.

When the range image processing unit 4 determines that underexposure occurred in the frame F1, it performs driving for solving the underexposure in a frame after the frame F1. For example, the driving for solving the underexposure may be driving that increases the exposure time. The exposure time here is the irradiation time multiplied by the number of irradiations. The irradiation time is the duration for which one light pulse PO is irradiated in one frame. The number of irradiations is the number of times the light pulse PO is irradiated in one frame. For example, the driving that increases the exposure time may be driving that extends the irradiation time, driving that increases the number of irradiations, or a combination of these.

FIG. 8 shows an example in which driving that doubles the exposure time in a frame F2 is performed as the driving for solving underexposure. When the exposure time is doubled, the ambient light and the reflected light RL will both have twice the amount of light before the exposure time was increased. Therefore, in the frame F2, the signal value S # of the integrated signal Q2 will be twice the signal value S. FIG. 8 shows that the breakdown of each of the two integrated signals Q (the integrated signals Q1 and Q2) contains a reflected light signal H #, which is a signal component originating from the reflected light RL, and an ambient light signal K #, which is a signal component originating from ambient light.

As shown in the left diagram of FIG. 8, the range image processing unit 4 determines a lower threshold TH # based on the signal value S # of the integrated signal Q2. For example, the range image processing unit 4 refers to the pre-stored noise information to identify that the noise corresponding to the signal value S # of the integrated signal Q2 is β, and determines the lower threshold TH # based on the identified noise (B). For example, the range image processing unit 4 sets the noise (B) as the lower threshold TH #. Alternatively, the range image processing unit 4 may set the value obtained by multiplying the noise (B) by N as the lower threshold TH #. N is a real number greater than zero.

As shown in the right diagram of FIG. 8, the range image processing unit 4 compared the reflected light signal H # in the integrated signal Q2 with the lower threshold TH #. The range image processing unit 4 subtracts the ambient light signal K # from the integrated signal Q2 by applying a conventional technique. If the comparison between the calculated reflected light signal H # and lower threshold TH # indicates that the reflected light signal H # is lower than the lower threshold TH #, the range image processing unit 4 determines that underexposure occurred. On the other hand, if the reflected light signal H # is greater than or equal to the lower threshold TH #, the range image processing unit 4 determines that underexposure did not occur. In the example shown in FIG. 8, the reflected light signal H # is not smaller than the lower threshold TH (TH #<H #), and therefore it is determined that underexposure did not occur.

It is also possible that the range image processing unit 4 determines whether overexposure occurred based on the signal value of the integrated signal.

A method in which the range image processing unit 4 determines whether overexposure occurred will be described. For example, the range image processing unit 4 obtains integrated signals Q output from each pixel 321 after driving each frame. Of the obtained integrated signals Q, the range image processing unit 4 selects the one with the greater signal value between two integrated signals Q containing the reflected light signal H for the evaluation of whether overexposure occurred. The range image processing 4 determines whether overexposure occurred by comparing the signal value of the integrated signal Q with an upper threshold. The upper threshold here is the upper limit of the amount of charge that can be integrated in a charge storage unit CS, that is, a value that is set uniformly based on the upper limit of the integrated signal Q. For example, the upper threshold is a value obtained by multiplying the upper limit of the integrated signal Q by a specific ratio that is greater than or equal to 0 and less than 1 (for example, 0.8).

Figure 9:
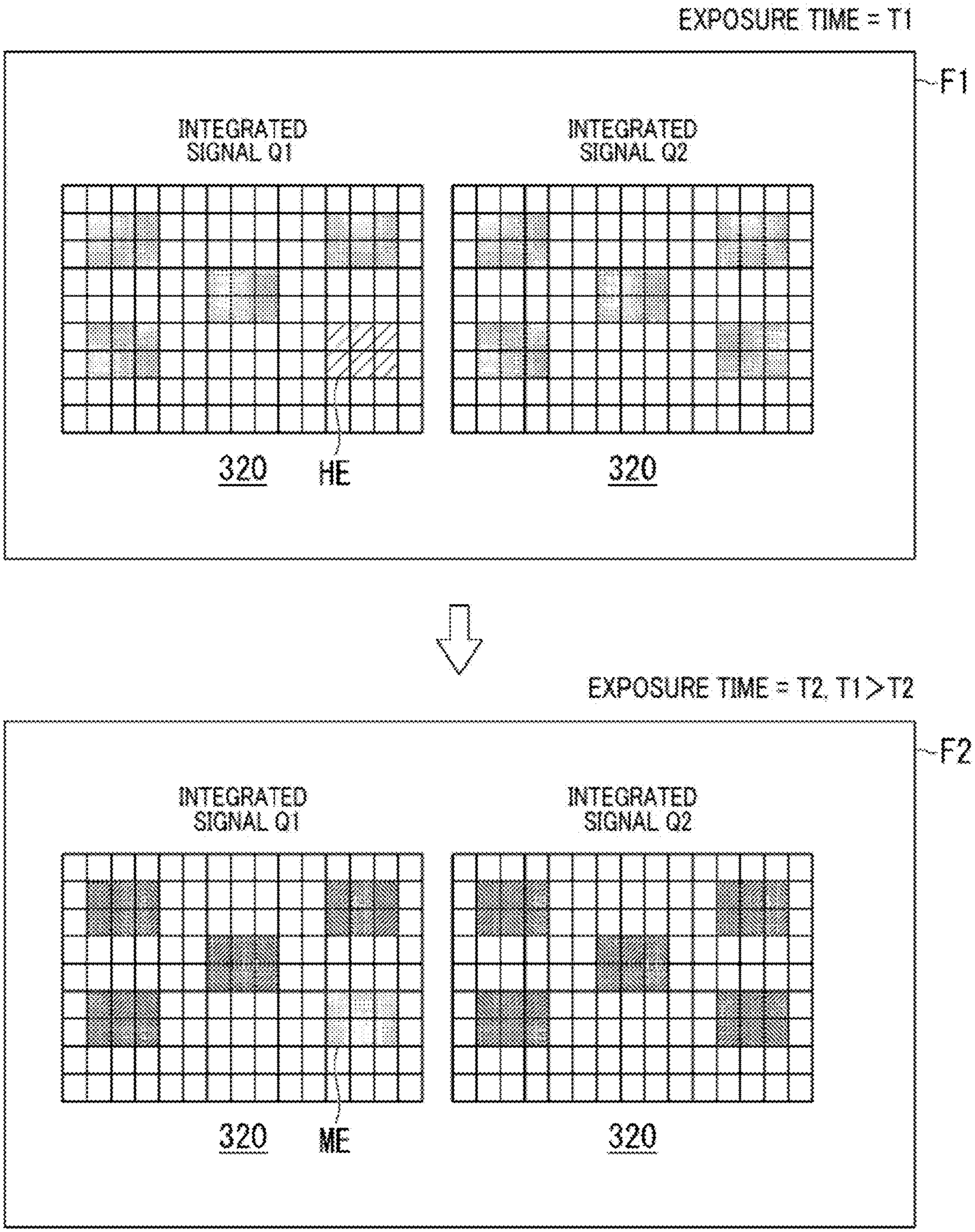
FIG. 9 is a diagram illustrating processing performed by the range imaging device according to the embodiment.
Figure 10:
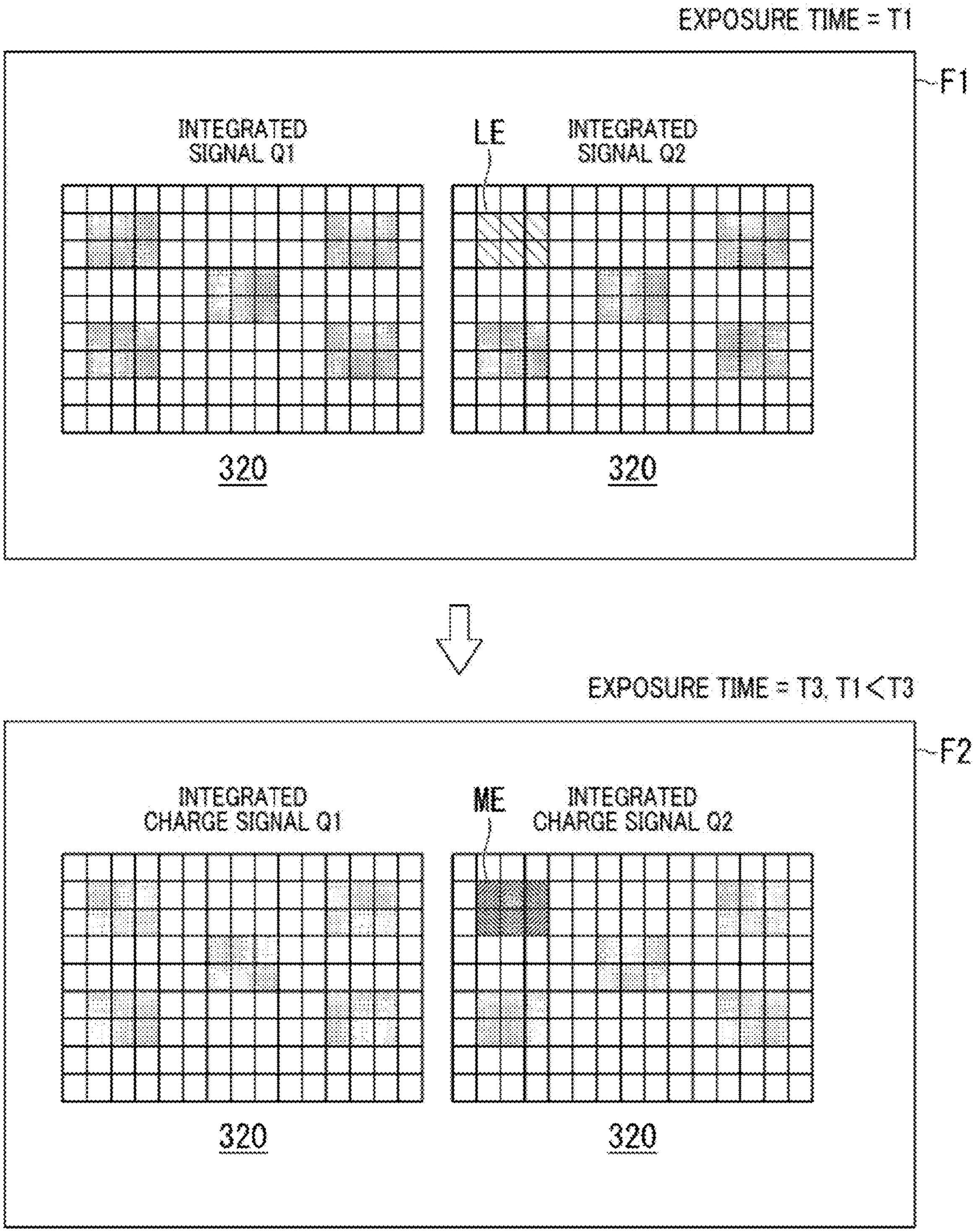
FIG. 10 is a diagram illustrating processing performed by the range imaging device according to the embodiment.
Figure 11:
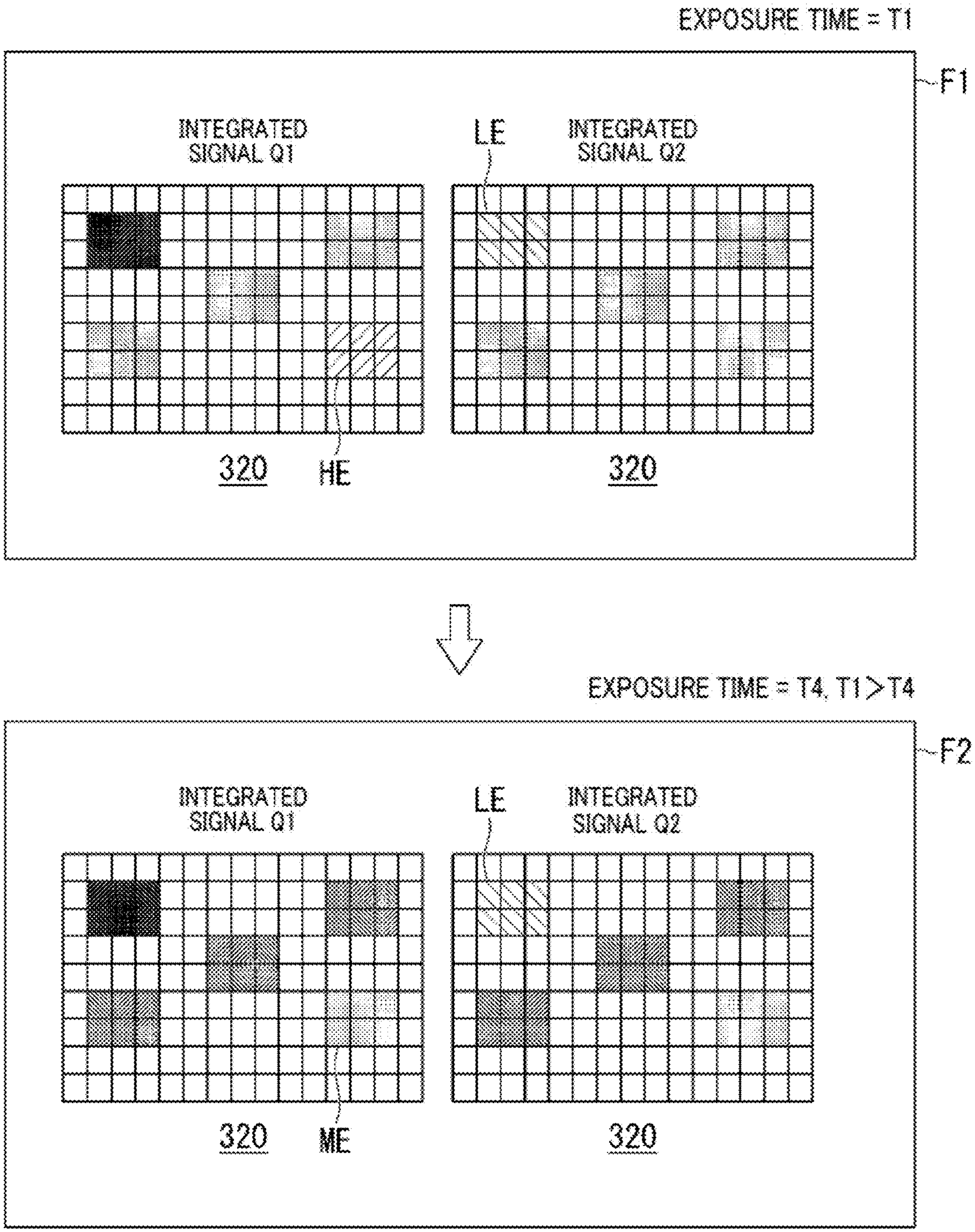
FIG. 11 is a diagram illustrating processing performed by the range imaging device according to the embodiment.

Next, referring to FIGS. 9 to 11, a method in which the range imaging device 1 controls exposure will be described. FIGS. 9 to 11 are diagrams illustrating processing performed by the range imaging device 1 of the present embodiment.

FIGS. 9 to 11 show schematic diagrams of an exposure state of the light-receiving region 320 after driving for one frame. More specifically, the upper part of FIGS. 9 to 11 shows the exposure state of the light-receiving region 320 after driving for the frame F1, and the lower part shows the exposure state of the light-receiving region 320 after driving for the frame F2. The frame F2 is a frame later than the frame F1, and is a frame driven by changing the exposure conditions according to the exposure state determined in the frame F1.

The upper part of FIG. 9 shows that, when exposure was performed with an exposure time T1 in the frame F1, an area HE corresponding to some pixels 321 in the light-receiving region 320 was determined to be overexposed based on the signal value of the integrated signal Q1.

When the range image processing unit 4 determines that overexposure occurred, it performs driving for solving the overexposure in a frame subsequent to the frame F1. The driving for solving overexposure may be driving that reduces the exposure time, for example, driving that reduces the irradiation time for each light pulse irradiation, driving that reduces the number of times a light pulse PO is irradiated per frame, or a combination of these.

For example, to solve the overexposure, the range image processing unit 4 controls the exposure so that it is performed with an exposure time T2 in the frame F2. The exposure time T2 is shorter than the exposure time T1 (T1>T2).

The lower part of FIG. 9 shows that when exposure was performed with the exposure time T2 in the frame F2, the area HE, which was overexposed in the frame F1, was determined to be an area ME that is not overexposed, and therefore the overexposure has been solved.

The upper part of FIG. 10 shows that, when exposure was performed with the exposure time T1 in the frame F1, an area LE corresponding to some pixels 321 in the light-receiving region 320 was determined to be underexposed based on the signal value of the integrated signal Q2.

In the example shown in FIG. 10, when the range image processing unit 4 determines that underexposure occurred in the frame F1, it controls the exposure so that it is performed with an exposure time T3 in the frame F2 in order to solve the underexposure. The exposure time T3 is longer than the exposure time T1 (T1<T3).

The lower part of FIG. 10 shows that when exposure was performed with the exposure time T3 in the frame F2, the area LE, which was underexposed in the frame F1, was determined to be an area ME that is not underexposed, and therefore the underexposure has been solved.

The upper part of FIG. 11 shows that, when exposure was performed with the exposure time T1 in the frame F1, the area HE was determined to be overexposed based on the signal value of the integrated signal Q1, and the area LE was determined to be underexposed based on the signal value of the integrated signal Q2.

Such a situation may arise in which the light-receiving region 320 has both underexposed and overexposed areas. The exposure control to be carried out in such a situation may be determined as appropriate depending on the situation, the purpose of the measurement, and the like.

For example, the range image processing unit 4 determines for each pixel 321 whether it is underexposed, overexposed, or neither. Then, the range image processing unit 4 calculates the proportion of pixels 321 that are determined to be underexposed (hereinafter, the underexposure proportion) and the proportion of pixels 321 that are determined to be overexposed (hereinafter, the overexposure proportion) among all pixels in the light-receiving region 320. The range image processing unit 4 compares the underexposure proportion with a predetermined underexposure threshold, and if the underexposure proportion is greater than or equal to the underexposure threshold, determines that the exposure time should be increased to solve the underexposure. Further, the range image processing unit 4 compares the overexposure proportion with a predetermined overexposure threshold, and if the overexposure proportion is greater than or equal to the overexposure threshold, determines to perform driving that reduces the exposure time in order to solve the overexposure. The underexposure and overexposure thresholds may be set as appropriate depending on the purpose of the measurement, for example, the type of subject for which measurement should be prioritized.

The example in FIG. 11 shows a case where the range image processing unit 4 has determined to solve overexposure based on the situation in the frame F1. Specifically, the range image processing unit 4 controls the exposure so that it is performed with an exposure time T4 in the frame F2. The exposure time T4 is shorter than the exposure time T1 (T1>T4).

The lower part of FIG. 11 shows that when exposure was performed with the exposure time T4 in the frame F2, the area HE, which was overexposed in the frame F1, was determined to be an area ME that is not overexposed, and therefore the overexposure has been solved. On the other hand, it shows that, in the area LE determined to be underexposed in the frame F1, the underexposure still has not been solved in the frame F2.

Figure 12:
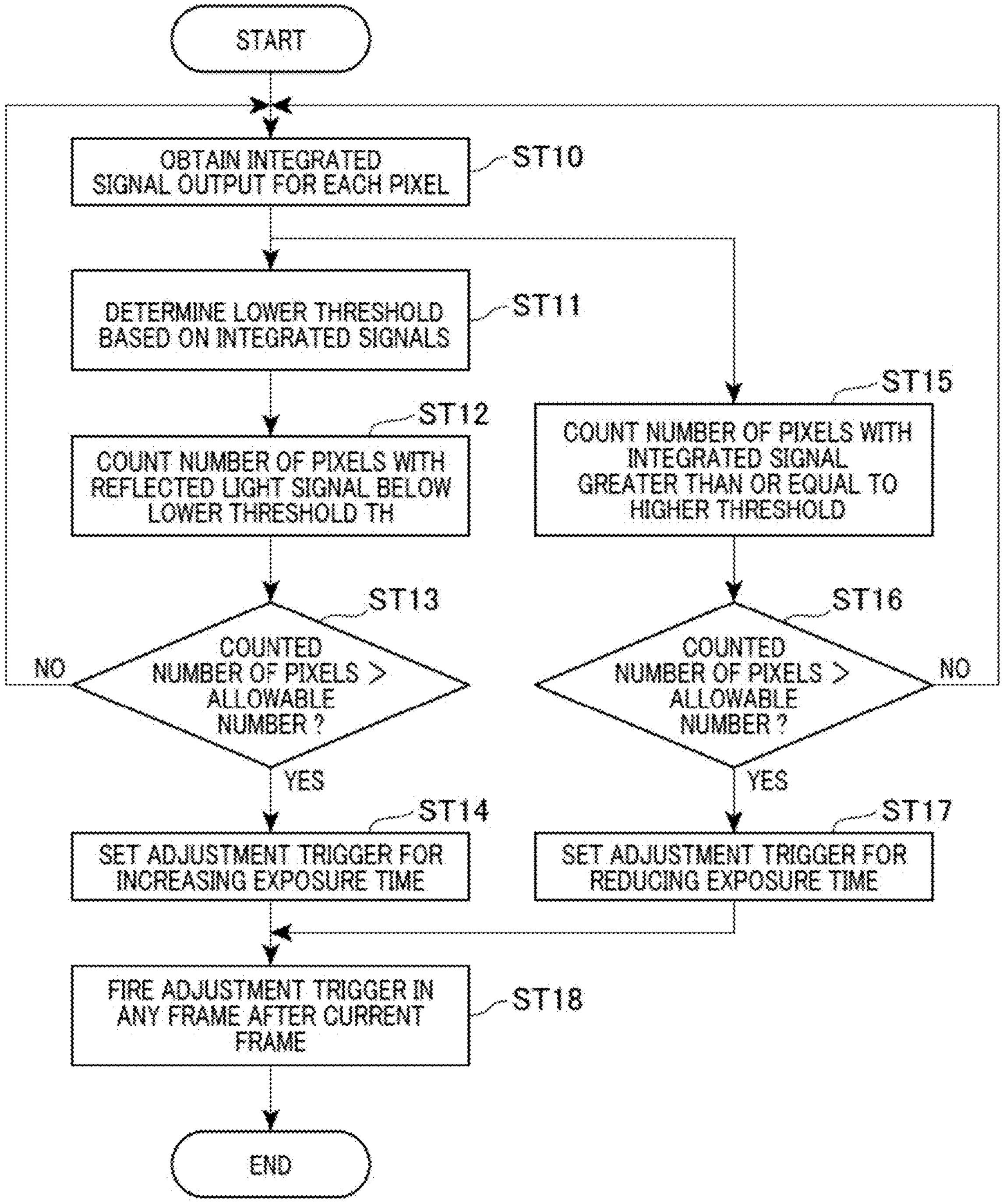
FIG. 12 is a flowchart illustrating the flow of processing performed by the range imaging device according to the embodiment.

Referring to FIG. 12, a flow of processing performed by the range imaging device 1 will be described. FIG. 12 is a flowchart illustrating the flow of the processing performed by the range imaging device 1 according to the embodiment.

ST10: The range imaging device 1 acquires the integrated signal Q output from each pixel 321. In a single frame, the range imaging device 1 drives the pixels 321 and acquires integrated signals Q (for example, integrated signals Q1 to Q3) output from each pixel 321.

ST11: The range imaging device 1 determines the lower threshold TH based on the integrated signals Q. Of the integrated signals Q output from each pixel 321, the range image processing unit 4 selects the one with the smaller signal value between two integrated signals Q containing the reflected light signal H. By referring to the noise information based on the signal value S of the selected integrated signal Q, the range image processing unit 4 acquires the noise (α) corresponding to the signal value S. For example, the range image processing unit 4 sets the noise (α) as the lower threshold TH.

ST12: The range imaging device 1 counts the number of pixels 321 whose reflected light signal H is smaller than the lower threshold TH. The range imaging device 1 calculates the reflected light signal H by subtracting the ambient light signal K from the signal value S of the integrated signal Q. The range imaging device 1 compares the calculated reflected light signal H with the lower threshold TH, and if the reflected light signal H is smaller than the lower threshold TH, counts the pixel 321 that output that integrated signal Q as a pixel determined to be underexposed.

ST13: The range imaging device 1 determines whether the counted number of pixels exceeds an allowable number. The range imaging device 1 determines whether the number of pixels 321 counted in ST12 is greater than or equal to a predetermined allowable number. The allowable number here corresponds to the number of pixels provided in the light-receiving region 320 multiplied by the underexposure proportion. In this way, the range imaging device 1 may determine whether to perform driving for solving underexposure, based on either the number or proportion of pixels determined to be underexposed.

ST14: If the counted number of pixels exceeds the allowable number in ST13, the range imaging device 1 sets an adjustment trigger for increasing the exposure time. The adjustment trigger here is a trigger for performing driving to solve underexposure. For example, the initial value of the adjustment trigger is zero, and the value of the adjustment trigger is set to 1 when the range imaging device 1 sets the adjustment trigger.

ST15: On the other hand, the range imaging device 1 counts the number of pixels 321 whose the integrated signal is greater than or equal to the upper threshold. The range imaging device 1 compares the signal value S of the integrated signal Q with the upper threshold, and if the signal value S is greater than or equal to the upper threshold, counts the pixel 321 that output that integrated signal Q as a pixel determined to be overexposed.

ST16: The range imaging device 1 determines whether the counted number of pixels exceeds an allowable number. The range imaging device 1 determines whether the number of pixels 321 counted in ST15 is greater than or equal to a predetermined allowable number. The allowable number here corresponds to the number of pixels provided in the light-receiving region 320 multiplied by the overexposure proportion. In this way, the range imaging device 1 may determine whether to perform driving for solving overexposure, based on either the number or proportion of pixels determined to be overexposed.

ST17: If the counted number of pixels exceeds the allowable number in ST16, the range imaging device 1 sets an adjustment trigger for reducing the exposure time. The adjustment trigger here is a trigger for performing driving to solve overexposure. For example, the initial value of the adjustment trigger is zero, and the value of the adjustment trigger is set to 1 when the range imaging device 1 sets the adjustment trigger.

ST18: The adjustment trigger is fired in any frame after the current frame. The range imaging device 1 refers to the adjustment trigger in any frame (for example, the frame F2) after the current frame (for example, the frame F1). Both a trigger for performing driving to solve underexposure and a trigger for performing driving to solve overexposure are referred to here.

When the trigger for performing driving to solve underexposure is set to one, the range imaging device 1 performs driving with an increased exposure time. On the other hand, when the trigger for performing driving to solve overexposure is set to one, the range imaging device 1 performs driving with a reduced exposure time.

When both the trigger for performing driving to solve underexposure and the trigger for performing driving to solve overexposure are set to one, the range imaging device 1 determines to perform either the driving to reduce the exposure time or the driving to increase the exposure time based on the situation, for example, the proportions of underexposed pixels and overexposed pixels.

The range imaging device 1 can determine, as appropriate, from which frame after the current frame the driving with the updated exposure time will be started. For example, the driving to increase the exposure time may be performed in the next frame immediately after the current frame. However, in cases where, for example, measurements are performed in an environment where the amount of ambient light changes frequently, possibly so frequently that the exposure time is changed every frame, a range image with a different brightness will be generated each time. This may result in a phenomenon called flicker and make it difficult for the user to view the range images. Due to this, if the range images should be captured in a manner that the user can view them, it is better to gradually change the exposure time. From this perspective, the range imaging device 1 may control exposure so that the exposure time changes every multiple number of frames, for example, every 10 frames or every 3 frames. On the other hand, if it is desired to measure the distance to the subject OB quickly and accurately without capturing range images in a manner that the user can view them, the exposure may be controlled so that the exposure time is changed every frame to capture images more quickly and with more appropriate exposure.

As described above, the range imaging device 1 of the present embodiment includes the light source unit 2, the light-receiving unit 3, and the range image processing unit 4. The light source unit 2 emits light pulses PO into the measurement space. The light-receiving unit 3 includes the pixels 321 each including the photoelectric conversion device PD and the charge storage units CS, and the vertical scanning circuit 323. The photoelectric conversion device PD generates charges according to the incident light. The vertical scanning circuit 323 distributes charge to the charge storage units CS for integration therein at a storage timing synchronized with the emission timing of emitting the light pulses PO. The vertical scanning circuit 323 is an example of the "pixel driver circuit". The range image processing unit 4 calculates the distance to the subject OB in the measurement space based on the amounts of charge integrated in the charge storage units CS. The range image processing unit 4 identifies, among the integrated signals Q corresponding to the amounts of charge integrated in the charge storage units CS in the current frame, integrated signals Q that each contain a signal corresponding to the amount of charge originating from the reflected light, which is the light pulse PO reflected off the subject OB, and a signal corresponding to the amount of charge originating from ambient light. The range image processing unit 4 calculates the lower threshold TH based on the degree of variation in the identified integrated signals Q. The range image processing unit 4 uses the integrated signals Q and the lower threshold TH to control the exposure time T in another frame that is temporally after the current frame. The exposure time T is the irradiation time multiplied by the number of irradiations. The irradiation time is the duration for which one light pulse PO is irradiated in one frame. The number of irradiations is the number of times the light pulse PO is irradiated in one frame.

Therefore, the range imaging device 1 of the present embodiment can calculate the lower threshold TH by using, among the integrated signals Q, integrated signals Q that each contain a signal corresponding to the amount of charge originating from the reflected light, which is the light pulse PO reflected off the subject OB, and a signal corresponding to the amount of charge originating from ambient light. As a result, exposure can be controlled based on the amount of integrated charge that is a combination of charges originating from the reflected light and ambient light.

Further, in the range imaging device 1 of this embodiment, the range image processing unit 4 calculates the noise ($\alpha$), which is the square root of the variance ($\alpha^2$) of the integrated signal Q (for example, signal value S), by using the noise information indicating the relationship between the mean and variance of the light incident on the light-receiving unit 3 per unit time. The range image processing unit 4 calculates the lower threshold TH based on the calculated noise ($\alpha$). Therefore, in the range imaging device 1 of this embodiment, the lower threshold TH can be calculated using noise information that is generated in advance by, for example, performing measurements, which facilitates the calculation of the lower threshold TH. The lower threshold TH can be calculated without performing special processing for extracting the amount of signal originating from ambient light from the integrated signal Q. This reduces the burden of performing such special processing, and also suppresses the occurrence of errors caused by the special processing.

Further, in the range imaging device 1 of the embodiment, the range image processing unit 4 sets a value obtained by multiplying the noise ($\alpha$) by N (N is a real number greater than zero) as the lower threshold TH. Therefore, in the range imaging device 1 of the embodiment, it is possible to adjust the lower threshold TH. For example, when there are a large number of pixels 321 determined to be underexposed, the lower threshold may be adjusted to a smaller value to identify pixels that are severely underexposed.

In the range imaging device 1 of this embodiment, the range image processing unit 4 calculates the reflected light signal H contained in the integrated signal Q. The range image processing unit 4 compares the reflected light signal H with the lower threshold TH, and if the reflected light signal H is smaller than the lower threshold TH, determines that the pixel 321 having the charge storage unit CS corresponding to that integrated signal is underexposed. In that case, the range image processing unit 4 increases the exposure time T in the frame F2. Therefore, in the range imaging device 1 of the embodiment, it is possible to easily determine whether underexposure occurred by comparing the reflected light signal H with the lower threshold TH.

In the range imaging device 1 of this embodiment, the range image processing unit 4 determines whether to increase the exposure time T in the frame F2 based on the underexposure proportion, that is, the proportion of pixels 321 determined to be underexposed to total pixels 321 provided in the light-receiving unit 3. Therefore, in the range imaging device 1 of this embodiment, exposure can be controlled while taking into consideration the overall exposure state of the pixels 321 provided in the light-receiving region 320.

In the range imaging device 1 of this embodiment, the range image processing unit 4 compares the integrated signal Q with an upper threshold (an upper threshold based on the upper limit of the integrated signal Q). When the integrated signal Q is greater than the upper threshold, the range image processing unit 4 determines that the pixel 321 having the charge storage unit CS corresponding to that integrated signal Q is overexposed. The range image processing unit 4 reduces the exposure time T in the frame F2. Therefore, in the range imaging device 1 of this embodiment, it is possible to control not only underexposure but also overexposure.

All or part of the range imaging device 1 and the range image processing unit 4 according to the above-described embodiment may be achieved by a computer. In that case, a program that achieves this function may be recorded on a computer-readable recording medium so that a computer system can read and run the program recorded on the recording medium. The "computer system" referred to herein includes an operating system (OS) and hardware such as peripheral devices. The "computer-readable recording medium" refers to a storage device such as a portable medium, e.g., a flexible disk, a magneto-optical disk, a ROM, a CD-ROM or the like, or a hard disk incorporated in the computer system. The "computer-readable recording medium" may include a medium that dynamically retains a program for a short period of time, such as a communication line that transmits a program through a network such as the internet or a telecommunication line such as a telephone line, or a medium that retains the program for a given period of time in that case, such as a volatile memory of a computer system that serves as a server or a client. The above programs may achieve part of the functions described above, or may achieve the functions in combination with programs already recorded in a computer system, or may achieve the functions by using a programmable logic device, such as an FPGA.

According to the above-described embodiment, exposure can be controlled based on the amount of integrated charge that is a combination of charges originating from the reflected light and ambient light.

Time-of-flight (hereinafter referred to as "TOF") range imaging devices use the speed of light to measure the distance to a subject based on the time of flight of light in a measurement space. A technique used in such range imaging devices is described that enables stable and accurate measurement of the distance to an object by adjusting the exposure by controlling the intensity and number of emitted light pulses (for example, JP 6922187 B).

However, the technique described in JP 6922187 B controls the exposure according to the intensity of ambient light. Although it depends on the relationship between the timing of light pulse emission and charge storage and the position of the subject, the charge integrated in the charge storage units is a combination of charges originating from the reflected light and ambient light. Therefore, to control exposure according to the intensity of ambient light, processing is required to extract the charge originating from ambient light from the charge integrated in the charge storage units. This processing may cause errors in ambient light measurement and hinder accurate exposure control.

A range imaging device and a range imaging method according to embodiments of the present invention adjust exposure based on the amount of integrated charge that is a combination of charges originating from the reflected light and ambient light.

A range imaging device according to an embodiment of the present invention includes: a light source unit that emits a light pulse to a measurement space; a light-receiving unit including a pixel having a photoelectric conversion device that generates charge corresponding to incident light and charge storage units that integrates the charge, and a pixel driver circuit that distributes the charge to the charge storage units for integration therein at a storage timing synchronized with an emission timing at which the light pulse is emitted; and a range image processing unit that calculates a distance to a subject in the measurement space based on amounts of charge integrated in the charge storage units. The range image processing unit calculates a lower threshold based on a degree of variation in an integrated signal identified to contain, among integrated signals corresponding to the amounts of charge integrated in the charge storage units in a current frame, a signal corresponding to an amount of charge originating from reflected light that is the light pulse reflected off the subject, and a signal corresponding to an amount of charge originating from ambient light, and uses the integrated signal and the lower threshold to control an exposure time in another frame that is temporally after the current frame.

According to an embodiment of the present invention, in the range imaging device, the range image processing unit calculates noise that is a square root of a variance of a signal value of the integrated signal by using noise information indicating a relationship between a mean and a variance of light incident on the light-receiving unit per unit time, and calculates the lower threshold based on the calculated noise.

According to an embodiment of the present invention, in the range imaging device, the range image processing unit sets a value obtained by multiplying the noise by N (N is a real number greater than zero) as the lower threshold.

According to an embodiment of the present invention, in the range imaging device, the range image processing unit calculates a reflected light signal corresponding to the amount of charge originating from the reflected light contained in the integrated signal, compares the reflected light signal with the lower threshold, and if the reflected light signal is smaller than the lower threshold, increases the exposure time in the other frame.

According to an embodiment of the present invention, in the range imaging device, the range image processing unit determines whether to increase the exposure time in the other frame based on a proportion of a number of pixels determined to be underexposed to a total number of the pixels provided in the light-receiving unit.

According to an embodiment of the present invention, in the range imaging device, the range image processing unit compares the integrated signal with an upper threshold based on an upper limit of the integrated signal, and if the integrated signal is greater than the upper threshold, reduces the exposure time in the other frame.

A range imaging method according to an embodiment of the present invention is performed by a range imaging device including: a light source unit that emits a light pulse to a measurement space; a light-receiving unit including a pixel having a photoelectric conversion device that generates charge corresponding to incident light and charge storage units that integrates the charge, and a pixel driver circuit that distributes the charge to the charge storage units for integration therein at an integration timing synchronized with an emission timing at which the light pulse is emitted; and a range image processing unit that calculates a distance to a subject in the measurement space based on amounts of charge integrated in the charge storage units. The range image processing unit calculates a lower threshold based on a degree of variation in an integrated signal identified to contain, among integrated signals corresponding to the amounts of charge integrated in the charge storage units in a current frame, a signal corresponding to an amount of charge originating from reflected light that is the light pulse reflected off the subject, and a signal corresponding to an amount of charge originating from ambient light, and uses the integrated signal and the lower threshold to control an exposure time in another frame that is temporally after the current frame.

According to an embodiment of the present invention, exposure can be controlled based on the amount of integrated charge that is a combination of charges originating from the reflected light and ambient light.

Obviously, numerous modifications and variations of the present invention are possible in light of the above teachings. It is therefore to be understood that within the scope of the appended claims, the invention may be practiced otherwise than as specifically described herein.

The invention claimed is:

1. A range imaging device, comprising:

a light source configured to emit a light pulse to a measurement space;

a light-receiving unit comprising a pixel having a photoelectric conversion device and a plurality of charge storage units that integrates charge generated by the photoelectric conversion device; and a range image processing unit comprising circuitry configured to calculate a distance to a subject in the measurement space based on amounts of charge integrated in the charge storage units, wherein the photoelectric conversion device of the pixel in the light-receiving unit generates the charge corresponding to incident light, the light-receiving unit includes a pixel driver circuit configured to distribute the charge to the charge storage units for integration at a storage timing synchronized with an emission timing at which the light pulse is emitted, and the circuitry of the range image processing unit is configured to calculate a lower threshold based on a degree of variation in an integrated signal identified to include, among integrated signals corresponding to the amounts of charge integrated in the charge storage units in a current frame, a signal corresponding to an amount of charge originating from the light pulse reflected off the subject, and a signal corresponding to an amount of charge originating from ambient light, and use the integrated signal and the lower threshold to control an exposure time in another frame that is temporally after the current frame.

2. The range imaging device according to claim 1, wherein the circuitry of the range image processing unit is configured to calculate noise that is a square root of a variance of a signal value of the integrated signal by using noise information indicating a relationship between a mean and a variance of light incident on the light-receiving unit per unit time, and calculate the lower threshold based on the calculated noise.

3. The range imaging device according to claim 2, wherein the circuitry of the range image processing unit is configured to set a value obtained by multiplying the noise by N, where N is a real number greater than zero, as the lower threshold.

4. The range imaging device according to claim 1, wherein the circuitry of the range image processing unit is configured to calculate a reflected light signal corresponding to the amount of charge originating from the light pulse reflected off the subject in the integrated signal, compare the reflected light signal with the lower threshold, and increase the exposure time in the other frame when the reflected light signal is smaller than the lower threshold.

5. The range imaging device according to claim 4, wherein the circuitry of the range image processing unit is configured to determine whether to increase the exposure time in the other frame based on a proportion of a number of pixels determined to be underexposed to a total number of the pixels in the light-receiving unit.

6. The range imaging device according to claim 1, wherein the circuitry of the range image processing unit is configured to compare the integrated signal with an upper threshold based on an upper limit of the integrated signal and reduce the exposure time in the other frame when the integrated signal is greater than the upper threshold.

7. The range imaging device according to claim 2, wherein the circuitry of the range image processing unit is configured to calculate a reflected light signal corresponding to the amount of charge originating from the light pulse reflected off the subject in the integrated signal, compare the reflected light signal with the lower threshold, and increase the exposure time in the other frame when the reflected light signal is smaller than the lower threshold.

8. The range imaging device according to claim 7, wherein the circuitry of the range image processing unit is configured to determine whether to increase the exposure time in the other frame based on a proportion of a number of pixels determined to be underexposed to a total number of the pixels in the light-receiving unit.

9. The range imaging device according to claim 2, wherein the circuitry of the range image processing unit is configured to compare the integrated signal with an upper threshold based on an upper limit of the integrated signal and reduce the exposure time in the other frame when the integrated signal is greater than the upper threshold.

10. The range imaging device according to claim 3, wherein the circuitry of the range image processing unit is configured to calculate a reflected light signal corresponding to the amount of charge originating from the light pulse reflected off the subject in the integrated signal, compare the reflected light signal with the lower threshold, and increase the exposure time in the other frame when the reflected light signal is smaller than the lower threshold.

11. The range imaging device according to claim 10, wherein the circuitry of the range image processing unit is configured to determine whether to increase the exposure time in the other frame based on a proportion of a number of pixels determined to be underexposed to a total number of the pixels in the light-receiving unit.

12. The range imaging device according to claim 3, wherein the circuitry of the range image processing unit is configured to compare the integrated signal with an upper threshold based on an upper limit of the integrated signal and reduce the exposure time in the other frame when the integrated signal is greater than the upper threshold.

13. The range imaging device according to claim 4, wherein the circuitry of the range image processing unit is configured to compare the integrated signal with an upper threshold based on an upper limit of the integrated signal and reduce the exposure time in the other frame when the integrated signal is greater than the upper threshold.

14. The range imaging device according to claim 5, wherein the circuitry of the range image processing unit is configured to compare the integrated signal with an upper threshold based on an upper limit of the integrated signal and reduce the exposure time in the other frame when the integrated signal is greater than the upper threshold.

15. A range imaging method, comprising:

emitting a light pulse to a measurement space from a light source unit of a range imaging device; and calculating a distance to a subject in the measurement space based on amounts of charge integrated in charge storage units of a light-receiving unit in the range imaging device, wherein the range imaging device includes the light source configured to emit the light pulse to the measurement space, the light-receiving unit comprising a pixel having a photoelectric conversion device and the charge storage units that integrate charge generated by the photoelectric conversion device, and a range image processing unit comprising circuitry configured to calculate the distance to the subject in the measurement space based on the amounts of charge integrated in the charge storage units, the photoelectric conversion device of the pixel in the light-receiving unit generates the charge corresponding to incident light, the light-receiving unit includes a pixel driver circuit configured to distribute the charge to the charge storage units for integration at a storage timing synchronized with an emission timing at which the light pulse is emitted, and the circuitry of the range image processing unit is configured to calculate a lower threshold based on a degree of variation in an integrated signal identified to include, among integrated signals corresponding to the amounts of charge integrated in the charge storage units in a current frame, a signal corresponding to an amount of charge originating from the light pulse reflected off the subject, and a signal corresponding to an amount of charge originating from ambient light, and use the integrated signal and the lower threshold to control an exposure time in another frame that is temporally after the current frame.

* * * * *